UNITED STATES PATENT OFFICE.

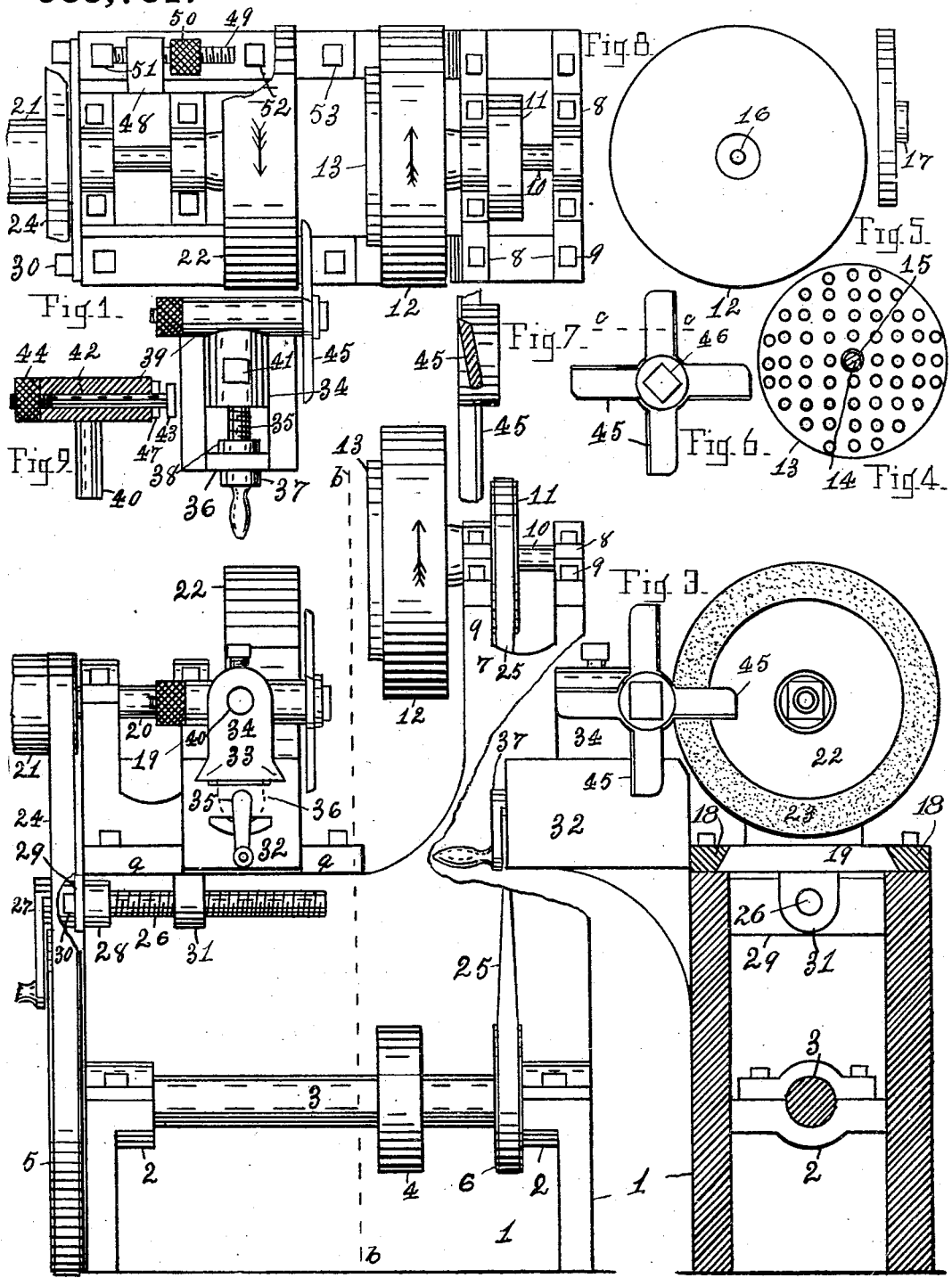
J. N. BECHARD.
SAUSAGE MEAT CUTTER GRINDER.
APPLICATION FILED DEC. 21, 1908.
935,731.
Patented Oct. 5, 1909.
WITNESSES:
F. A. Nichlos.
C. M. Albee.
INVENTOR.
Joseph N. Bechard.
BY G. H. Albee.
ATTORNEY.

JOSEPH N. BECHARD, OF NEW LONDON, WISCONSIN.

SAUSAGE-MEAT-CUTTER GRINDER.

935,731.  Specification of Letters Patent.  Patented Oct. 5, 1909.

Application filed December 21, 1908. Serial No. 468,620.

*To all whom it may concern:*

Be it known that I, JOSEPH N. BECHARD, a citizen of the United States, residing at New London, in the county of Waupaca and State of Wisconsin, have invented a new and useful Sausage-Meat-Cutter Grinder, of which the following is a specification.

My invention relates to a grinding machine for grinding the cutting knives and disks of sausage meat cutters, such as consist of a circular disk perforated with many small circular holes and having a knife, or rather a plurality of blades which are usually arranged in the form of a cross, but may have blades more or less in number in some cases, and are revolved with their cutting edges in close contact with the face of said disk and across said perforations. These disks and blades although made of very hard metal, with long use in cutting the various kinds of meat become worn so that instead of a clean cut being made, the meat is mashed and torn, producing an unsightly product and imposing additional power to be applied for operating the cutters, whether it be manual or mechanical, in order to perform the work required. The blades are made on the side that is in contact with the disk so that only a very small width of it requires grinding, but each blade requires to be ground perfectly straight and to the same degree that each of the others is, so that the blades when in use will lie close to the face of the perforated disk, and in order to do this, specially constructed mechanism is required, which will be fully described herein. As the perforated disk must be ground to a perfectly straight face, that also requires specially constructed means for holding it while being ground, which will also be described, all of which is shown in the accompanying drawing, in which,—

Figure 1 is a plan, or top view of the machine in which my invention is carried out. Fig. 2 is a side elevation of the machine, the front side of the machine up to the line *a, a*, being removed, and the right hand end being broken in to, by a part of Fig. 3. Fig. 3 is a vertical section of the machine upon the line *b, b*, of Fig. 2, as it appears in looking toward the left. Fig. 4 is a plan of the perforated cutter. Fig. 5 is an edge view of the perforated cutter. Fig. 6 is a plan of the cutting blades. Fig. 7 is a sectional view of one blade upon the line *c, c*, of Fig. 6, upon a larger scale than the other figures. Fig. 8 is an elevation of the face plate, or the holder for the disk while it is being ground. Fig. 9 is a plan, partly in section, of a device for holding the knife blades while being ground.

Similar numerals indicate like parts in the several views.

1, indicates the frame of the machine, which may be a single casting, although I make no broad claim to the frame, any suitable one being allowable.

In the lower part of the frame in journal boxes 2, a driving shaft 3, is mounted, it having a pulley 4 by which it may be driven from any suitable source of power, and two pulleys 5 and 6 for driving the mechanism of the machine. Mounted upon the right hand end of the frame and integral with it is a head block 7, carrying journal boxes 8, which are secured to the head block with screws 9, in which boxes a shaft 10, is journaled. The shaft carries a pulley 11, by which it may be revolved from the pulley 6, and on its inner end is secured a face plate 12, the perforated circular disk 13 of the sausage cutter being secured to it by the insertion of a screw 14, having a head beveled and slotted similar to a wood screw, inserted through its central bore 15, into the screw hole 16 in the face plate, the face plate having a bore outside of said screw hole for receiving the hub 17 of the disk, and the disk being rimmed out for allowing the head of the screw 14 to enter beyond the face of the disk. For sharpening a disk, a grinding wheel may thereby be used of a diameter sufficiently large to cover the disk when secured to the face plate, to its center.

Mounted to slide within the ways 18, is a head block 19, carrying a shaft 20 having on it a pulley 21 at its outer end and an emery, or similar grinding wheel 22, upon its inner end. This grinding wheel is cupped out, as shown in Fig. 3, and has an annular grinding ring 23. The pulley 21, is to be driven by a belt from the pulley 5, and one of said pulleys should have sufficient width of face for permitting the head block 19 to slide forward in its ways 18, until the grinding wheel can engage with and grind the face of the perforated disk when secured upon the face plate. It will be observed in Fig. 2, that the upper surface of the circumference of the grinding wheel is at substantially, the same height as the axial line of the face plate 12, that the face plate and grinding wheel are revolved as indicated by arrows in Figs. 1 and 2 in opposite directions, the grinding wheel by a straight belt 24 from the pulley 5 on the shaft 3, and the face plate from a pulley 6 on the same shaft 3, with a crossed belt 25. It is of course immaterial which belt is crossed. The grinding wheel is shown at its extreme backward position from the face plate, as then with a screw driver, a person can insert the screw at the center of the face plate for securing the disk thereto. It will be evident that if the axial center of the face plate is at the right or left of the circumference of the grinding wheel, that the disk to be ground can be as easily secured to the face plate, as when it is vertically above it as herein shown, and the disk can be just as well ground.

The head block 19 is provided with a threaded crank shaft 26, which is journaled between its hub 27 and collar 28, in the cross bar 29, which bar is secured to the end of the frame 1, with bolts 30. The threads of said crank shaft engage a nut 31, which is attached to or is integral with said head block, whereby the turning of said crank shaft in one direction will feed the head block toward the face plate, and turning it the other, recede it therefrom. In grinding the disk, the head block is to be run up to the disk, by means of the turning of the crank shaft by the attendant. From the relative diameters of the pulleys, it will be evident that the grinding wheel will revolve many times more in a given time than the face plate.

For sharpening the cutting blades, the head block 19, is run back to the position shown in Figs. 1 and 2 and the cutting blade holder brought into use. This blade holder consists of the bracket extension 32, having grooved ways 33, arranged at right angles with the grinding wheel shaft, in which a tool stock 34 is arranged to slide, it being movable transversely of the frame 1 by means of the crank shaft 35, said shaft being journaled in the cross bar 36 of the bracket extension between its hub 37 and collar 38.

Mounted to oscillate in the tool stock 34, is the cutter holder 39, its cylindrical arm 40, being fitted to enter a bore in the tool stock and be retained therein in any desired circumferential position, by means of the set screw 41. Transversely of the arm 40, the cutter holder is bored longitudinally, and a bolt 42, loosely arranged therein, it having a head 43, and a burred nut 44. The cutters 45 are provided with a square perforation 46, for receiving the end 47 of the cutter holder, which cutters being placed thereon the bolt 42 can be inserted and its nut put on and screwed up for holding the cutters thereon. The cutting faces of the cutters, as is shown in Fig. 7, are not at right angles with the axis of the cutters, but are inclined 3 to 5 degrees probably from a right angle, and they are sharpened by grinding them at a less angle, perhaps 2 degrees from a right angle. This angle is obtained by turning the arm 40, in the cutter holder 39, to the correct angle and securing it in position with the set screw 41. Having secured the cutters at the desired angle, the tool holder being at the rearward limit of its movement, the cutters can be ground by feeding the tool holder forward, and one blade of the cutter across the face of the grinder ring of the grinder wheel, said wheel being fed forward to a pre-determined stop, at the same time the cutter is being fed across the face of the grinding wheel, by means of its crank shaft 35. One blade having been ground, the nut 44 is loosened and another blade brought into position and made secure, when said sharpening operation is repeated.

For limiting the forward movement of the head block 19, an arm 48, integral with the head block is provided with a screw 49 passing through it and having a bur 50 by which the screw may be turned. A stop 51, which in the present case is one of the bolts by which the strip 18 is secured in position, is arranged for limiting the rearward movement of the head block, and a stop 53, is arranged for limiting the forward movement when sharpening cutters. The exact point of the stopping of the head block can be governed by turning the screw 49 by its bur 50. By removing the stop 52, the head block can be slid forward to the stop 54, or until the grinding wheel can engage the face of the disk upon the face plate.

All of the blades of the cutter having been ground, the cutters can be removed and others inserted, or another disk can be placed upon the face plate, as occasion requires.

Having described my invention, what I claim and desire to secure by Letters Patent, is,—

1. In a machine for sharpening sausage meat cutters that consist of a perforated circular disk and a plurality of cutting blades arranged to be revolved around upon said disk, the combination of a suitable frame, a head block arranged for a sliding movement lengthwise of said frame, means for sliding said head block, a stop for limiting the forward movement of said head block, a shaft arranged horizontally and parallel with said sliding movement for revolution in said head block, a cup shaped grinding wheel having a grinding ring around one end face of said wheel mounted upon one end of said shaft, means for revolving said grinding wheel, a holder for sausage meat cutters arranged for sliding outside of the circumference of said grinding wheel in a direction at right angles with the shaft of said grinding wheel, means for securing meat cutter blades upon said holder, means for changing the angle of the face of said blades at which said face is presented to the grinding face of said wheel, and means for sliding said cutter holder and carrying a blade of the cutter across the face of the ring of said grinding wheel.

2. In a machine for sharpening sausage meat cutters that consist of a perforated circular disk and a plurality of cutting blades arranged to be revolved around upon said disk, the combination of a suitable supporting frame, the journal boxes 2, thereon, the driving shaft 3, mounted in said boxes, means for revolving said shaft, the pulley 5 thereon, the ways 18 in said frame, the head block 19, the crank shaft 26, arranged for sliding said head block, a stop for limiting the forward movement of said head block, the shaft 20, mounted for revolution in said head block, the pulley 21, thereon, the grinding wheel 22 on said shaft 20, the grinding ring 23, integral with said wheel, a sausage meat cutter holder arranged for sliding in a direction at right angles with the axis of said wheel, a suitable support for said holder, the ways 33 in said holder, the tool stock 34, the crank shaft 35, arranged for sliding said tool stock in a direction at right angles with the shaft 20, the cutter holder 39, adapted for receiving meat cutter blades, the arm 40, thereon, arranged for oscillation in the holder, the set screw 41, the bolt 42 having a head 43 and nut 44, said parts being arranged and operating substantially as described.

J. N. BECHARD.

Witnesses:
 KURT FALBE,
 GUSTAV FALBE.